(12) United States Patent
Zhang et al.

(10) Patent No.: US 12,415,377 B2
(45) Date of Patent: Sep. 16, 2025

(54) OPTICAL ANTI-COUNTERFEITING ELEMENT AND OPTICAL ANTI-COUNTERFEITING PRODUCT

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Weiwei Zhang, Beijing (CN); Chunhua Hu, Beijing (CN)

(73) Assignees: ZHONGCHAO SPECIAL SECURITY TECHNOLOGY CO., LTD, Beijing (CN); CHINA BANKNOTE PRINTING AND MINTING CORP., Beijing (CN)

( * ) Notice: Subject to any disclaimer, the term of this patent is extended or adjusted under 35 U.S.C. 154(b) by 631 days.

(21) Appl. No.: 17/637,421

(22) PCT Filed: Aug. 12, 2020

(86) PCT No.: PCT/CN2020/108676
§ 371 (c)(1),
(2) Date: Feb. 22, 2022

(87) PCT Pub. No.: WO2021/031953
PCT Pub. Date: Feb. 25, 2021

(65) Prior Publication Data
US 2022/0274435 A1    Sep. 1, 2022

(30) Foreign Application Priority Data

Aug. 19, 2019   (CN) .......................... 201910765040.8

(51) Int. Cl.
*B32B 3/30*     (2006.01)
*B42D 25/324*   (2014.01)
*B42D 25/36*    (2014.01)
*G02B 1/10*     (2015.01)
*B42D 25/45*    (2014.01)

(52) U.S. Cl.
CPC .......... *B42D 25/324* (2014.10); *B42D 25/36* (2014.10); *G02B 1/10* (2013.01); *B42D 25/45* (2014.10)

(58) Field of Classification Search
CPC ...... B42D 25/324; B42D 25/36; B42D 25/45; B42D 25/328; B42D 25/445; B42D 25/29; G02B 1/10
(Continued)

(56) References Cited

U.S. PATENT DOCUMENTS 7,142,363 B2 *  11/2006  Sato ..................... G02B 5/1857
                                                    398/43
2004/0130785 A1 *  7/2004  Yun ......................... G02B 3/08
                                                    359/565

(Continued)

FOREIGN PATENT DOCUMENTS

CN    101952128 A    1/2011
CN    102460236 A    5/2012
(Continued)

OTHER PUBLICATIONS

Extended European search report for EP 20854829 mailed on May 7, 2023.
(Continued)

*Primary Examiner* — Audrey Y Chang
(74) *Attorney, Agent, or Firm* — Dennemeyer & Associates LLC (57) ABSTRACT

The disclosure provides an optical anti-counterfeiting element and an optical anti-counterfeiting product, the optical anti-counterfeiting element includes: a substrate (2) having a first surface and a second surface opposite to each other; a microstructure formation layer (3) formed on the first surface, the microstructure formation layer (3) includes at least a first region (41), the first region (41) includes at least (Continued)

a first microstructure (5), the first microstructure (5) includes a convex portion and/or a concave portion; and optically variable coatings (4a, 4b) homomorphically covering on the first microstructure (5), the optically variable coatings (4a, 4b) include reflective layers (4a1, 4b1), dielectric layers (4a2, 4b2) and absorption layers (4a3, 4b3) which are stacked in sequence, wherein the reflective layers (4a1, 4b1) or the absorption layers (4a3, 4b3) are in contact with the first microstructure (5), and the dielectric layers (4a2, 4b2) are obtained by coating or printing.

16 Claims, 4 Drawing Sheets

(58) Field of Classification Search
USPC .............................................. 359/565, 569, 2
See application file for complete search history.

(56) References Cited

U.S. PATENT DOCUMENTS

| | | | | |
|---|---|---|---|---|
| 2006/0285184 | A1* | 12/2006 | Phillips | G02B 5/287 359/2 |
| 2013/0288458 | A1* | 10/2013 | Wei | H01L 21/0254 977/742 |
| 2014/0037898 | A1* | 2/2014 | Tompkin | B29D 11/0074 428/141 |
| 2019/0193453 | A1* | 6/2019 | Fournier | B42D 25/328 |

FOREIGN PATENT DOCUMENTS

| | | |
|---|---|---|
| CN | 108466504 A | 8/2013 |
| CN | 103448411 A | 12/2013 |
| CN | 105015215 A | 11/2015 |
| CN | 106808835 A | 6/2017 |
| CN | 107921810 A | 4/2018 |
| CN | 109895526 A | 6/2019 |
| DE | 102015006793 A1 | 12/2016 |
| EP | 3260302 A1 | 12/2017 |
| JP | 2016117185 A | 6/2016 |
| WO | 2005095119 A1 | 10/2005 |
| WO | 2011068002 A1 | 6/2011 |

OTHER PUBLICATIONS

International Search Report issued in connection with PCT Application No. PCT/Cn2020/108676, dated Nov. 18, 2020.

\* cited by examiner

Fig. 6b tilt to the left     middle of the location     tilt to the left

OPTICAL ANTI-COUNTERFEITING ELEMENT AND OPTICAL ANTI-COUNTERFEITING PRODUCT

CROSS-REFERENCE TO RELATED APPLICATION

This is a 35 U.S.C. 371 National Stage Patent Application of International Application No. PCT/CN2020/108676, filed Aug. 12, 2020, which claims priority to Chinese Patent Application No. 201910765040.8 filed on Aug. 19, 2019, each of which is incorporated herein by reference.

TECHNICAL FIELD

The disclosure relates to the technical field of optical anti-counterfeiting, and in particular to an optical anti-counterfeiting element and an optical anti-counterfeiting product.

BACKGROUND

Being awfully sensitive to color and color change, human eyes can distinguish small differences between any two different colors, so color change as an optical anti-counterfeiting element is a highly efficient anti-counterfeiting feature. An optical anti-counterfeiting element based on color and color change has been used as an important optical anti-counterfeiting feature in a number of fields such as banknote anti-counterfeiting, brand protection and so on. According to an optical principle, the color of the anti-counterfeiting element can change, that is, when the optical anti-counterfeiting element is tilted, the color in the optical anti-counterfeiting element changes along with the change of an observation angle. With the color change extremely easy to recognize, a user is not required to learn strenuously. In order to achieve the color change, the principle of a 'Fabry-Perot' filter and a structure of 'an absorption layer/a dielectric layer/a reflective layer' are used, so as to form an optically variable coating with a color changing along with the change of an observation angle. The coating or the optical anti-counterfeiting element changes in optical color when tilted. Correspondingly, the structure and the corresponding product can also be collectively called as 'optically variable film'.

The human eyes also have abilities to vitally sensitively perceive and distinguish dynamic features or stereoscopic effects, so in the technical field of optical anti-counterfeiting, it is a common optical anti-counterfeiting form to use dynamic elements to form a unique visual effect. When the observer changes the observation angle, for example, when the optical anti-counterfeiting element is tilted, or the illumination direction of a light source is changed, or the observation direction of the observer is changed, the positions and/or shapes of certain specific graphic and text elements in the optical anti-counterfeiting element change. The change features such as position changes and shape changes are easy to recognize, and the observer can feel obvious dynamic effects in an extremely short time, such as a few seconds, without being excessively trained. The relief stereoscopic feature is that on a plane, through specific arrangements, a stereoscopic effect that specific microstructures protrude above the element plane or are sunken below the element plane is formed. The dynamic and relief structures are formed of the microstructures, and are flat when the element is touched, but can show a dynamic or concave-convex effect visually. In the related art, the dynamic or relief structures are simply combined with the optically variable effect. For example, the dynamic and relief structures both show the same optically variable effect, and when the optical anti-counterfeiting element is tilted, the dynamic and relief structures both change into the same color, so as to form a relatively single anti-counterfeiting effect. Meanwhile, due to the same color, sometimes the boundaries of the relief and dynamic structures and the boundary of the background are not obvious, and may be mutually confused.

SUMMARY

The objective of the embodiments of the disclosure is to provide an optical anti-counterfeiting element and an optical anti-counterfeiting product, which may achieve different optically variable color effects in different regions and different dynamic or relief feature regions.

In order to achieve the above objective, an embodiment of the disclosure provides an optical anti-counterfeiting element, which includes: a substrate, the substrate has a first surface and a second surface opposite to each other; a microstructure formation layer formed on the first surface, the microstructure formation layer includes at least a first region, the first region includes at least a first microstructure, the first microstructure includes a convex portion and/or a concave portion; and an optically variable coating homomorphically covering on the first microstructure, the optically variable coating includes a reflective layer, a dielectric layer and an absorption layer which are stacked in sequence, wherein the reflective layer or the absorption layer is in contact with the first microstructure, and the dielectric layer is obtained by coating or printing.

Correspondingly, an embodiment of the disclosure further provides a manufacturing method of an optical anti-counterfeiting element, which includes: providing a substrate, the substrate has a first surface and a second surface opposite to each other; arranging a microstructure formation layer on the first surface of the substrate; forming at least a first region on the microstructure formation layer, the first region includes at least a first microstructure, and the first microstructure includes a convex portion and/or a concave portion; and forming an optically variable coating on the microstructure formation layer, including: forming a reflective layer or an absorption layer homomorphically covering on the microstructure formation layer; obtaining a dielectric layer on the reflective layer or the absorption layer by coating or printing; and forming the absorption layer homomorphically covering on the dielectric layer under the circumstance that the reflective layer is formed on the first microstructure, or forming the reflective layer homomorphically covering on the dielectric layer under the circumstance that the absorption layer is formed on the first microstructure.

Correspondingly, an embodiment of the disclosure further provides an optical anti-counterfeiting product, which includes the above optical anti-counterfeiting element.

Through the above technical solution, the first microstructure includes the convex portion and/or the concave portion, such that when the dielectric layer is obtained by coating or printing, due to fluidity of the dielectric layer, a thickness of the dielectric layer formed on the surface of a top portion of the first microstructure may be the same as or different from a thickness of the dielectric layer formed on the surface of a bottom portion of the first microstructure. Under the circumstance that the thickness of the dielectric layer formed on the surface of the top portion of the first microstructure are the same as the thickness of the dielectric layer formed on the surface of the bottom portion of the first microstructure, when the optical anti-counterfeiting element is tilted, a color change effect, that is, an optically variable effect, may be achieved. Under the circumstance that the thickness of the dielectric layer formed on the surface of the top portion of the first microstructure is different from the thickness of the dielectric layer formed on the surface of the bottom portion of the first microstructure, a first color of the optically variable coating at the top portion of the first microstructure is different from a second color of the optically variable coating at the bottom portion of the first microstructure, such that when the optical anti-counterfeiting element is observed, a color formed by mixing the first color and the second color is appeared. When the optical anti-counterfeiting element is observed with a magnifying lens, obvious stripes in the first color and the second color may be observed, which may be used for two-line anti-counterfeiting, such that an anti-counterfeiting performance of the optical anti-counterfeiting element is enhanced.

Other features and advantages of the embodiments of the disclosure will be described in detail in the specific embodiments that follows.

BRIEF DESCRIPTION OF THE DRAWINGS

The accompanying drawings, which are used for providing further understanding of the embodiments of the disclosure and constitute a part of the description, together with the following specific embodiments, serve to explain the embodiments of the disclosure instead of limiting same. In the accompanying drawings:

FIG. 6b shows a schematic diagram of an anti-counterfeiting effect of the optical anti-counterfeiting element shown in FIG. 6a.

DETAILED DESCRIPTION OF THE EMBODIMENTS

The detailed description of the embodiment of the disclosure is described in detail below in conjunction with the accompanying drawings. It should be understood that the specific embodiment is described herein is merely illustrative of the embodiment of the disclosure and is not intended to limit the embodiment of the disclosure.

An embodiment of the disclosure provides an optical anti-counterfeiting element, which includes: a substrate, the substrate has a first surface and a second surface opposite to each other; a microstructure formation layer formed on the first surface, the microstructure formation layer includes at least a first region, the first region includes at least a first microstructure, the first microstructure includes a convex portion and/or a concave portion; and an optically variable coating homomorphically covering on the first microstructure, the optically variable coating includes a reflective layer, a dielectric layer and an absorption layer which are stacked in sequence, wherein the reflective layer or the absorption layer is in contact with the first microstructure, and the dielectric layer is obtained by coating or printing. That is, the optically variable coating is of a structure of 'the reflective layer/the dielectric layer/the absorption layer' or 'the absorption layer/the dielectric layer/the reflective layer'. When the optical anti-counterfeiting element is tilted, the optical anti-counterfeiting element may appear a color change effect, that is, an optically variable effect. The first region may also be called as a microstructure region.

The substrate may be at least partially transparent, may also be a colored dielectric layer, may also be a transparent dielectric film with a functional coating on the surface, and may also be a compounded multi-layer film. The substrate may be formed of a film material with good physical and chemical resistance and high mechanical strength, for example, the substrate may by formed of a plastic film such as a polyethylene terephthalate (PET) film, a polyethylene naphthalate (PEN) film and a polypropylene (PP) film, and in an embodiment, the substrate 1 is formed of the PET material.

The microstructure formation layer may be replicated in batches by ultraviolet casting, mould pressing, nano-impressing and other processing modes. For example, the microstructure formation layer may be formed of a thermoplastic resin by mould pressing process, that is, the thermoplastic resin which the substrate is pre-coated with is softened and deformed by heating when passing through a high-temperature metal template, such that a specific undulating structure is formed, and then is cooled and moulded. The microstructure formation layer may be formed by radiation curing casting, that is, the substrate is coated with a radiation-curable resin, an original template is pushed and pressed thereon, and at the same time, radioactive rays such as ultraviolet rays or electron beams are radiated, such that the above material is cured, and then the original template is taken down to form the microstructure formation layer.

In an embodiment, a top portion formed of the convex portion of the first microstructure or a bottom portion formed of the concave portion of the first microstructure may have a flat surface, or a top portion formed of the convex portion of the first microstructure and a bottom portion formed of the concave portion of the first microstructure have flat surfaces, that is, the top portion and the bottom portion of the first microstructure may be flat surfaces, and more specifically, the first microstructure in an embodiment of the disclosure is a microstructure with a flat top portion, a flat bottom portion and a steep side wall. It can be understood that the embodiment of the disclosure is not limited thereto, and a surface of the top portion and a surface of the bottom portion of the first microstructure may not be flat surfaces, for example, may be in a zigzag shape. The first microstructures in the first region may have the same period, so as to have a diffractive feature.

Particularly, the period of the first microstructures may change according to a preset rule, such that the first region in the optical anti-counterfeiting element may appear a specific optical effect. For example, the period of the first microstructures with a flat top portion, a flat bottom portion and a steep side wall may change according to a binary Fresnel structure, such that a stereoscopic relief effect that the first region protrudes above or is sunken below a surface of an optical element is appeared. For the binary Fresnel structure, a real relief structure needs to be processed in multiple steps. For example, an relief feature needs to be subjected to computer stereo image modeling, then approximation of a continuous relief diffraction lens is carried out, and finally dualization of a diffraction structure is carried out. For details, see 'Introduction to Binary Optics' in the book Physical Optics edited by Liao Yanbiao. The method is to obtain a macroscopic stereoscopic relief structure by a microstructure with variable density.

In an embodiment, the first microstructures may have consistent periodicity in a microscopic size and randomness in a macroscopic size, which may form a random scattering effect similar to that formed by printing.

In the optical anti-counterfeiting element provided in an embodiment of the disclosure, the first microstructures may have the same directions or changeable directions, and a dynamic feature may be achieved by changing an azimuth angle of the first microstructures. When an incident direction of light is perpendicular to the microstructure, reflection light follows a principle of specular reflection, so as to be still perpendicular to the microstructure. Therefore, an exit angle of the reflection light may be modulated by adjusting the azimuth angle of the first microstructure, that is, by rotating the first microstructure in a plane of the optical anti-counterfeiting element. According to the principle, the first microstructures in different directions are arranged in different portions of the first region, and at any time, only when the direction of the first microstructure is parallel to a human eye, the first microstructure in the portion may reflect light into the human eye, so as to be observed by an observer. Under the circumstance that through proper arrangement, the first microstructures are sequentially arranged by rotating from top to bottom, for example, by rotating from −45° to 45°, when the observer tilts the optical anti-counterfeiting element leftwards and rightwards, the microstructures at different positions sequentially reflect light, so as to be seen by the observer, and the observer may feel that a bright spot sequentially move from an upper portion to a lower portion of the optical anti-counterfeiting element, such that the dynamic feature is appeared.

In the optical anti-counterfeiting element of the embodiment of the disclosure, the absorption layer and the reflective layer may be obtained by vapor deposition, for example, by physical vapor deposition, so as to keep the same shape as the first microstructures, that is, the absorption layer and the reflective layer homomorphically cover on the first microstructures, and a thickness of the reflective layer or the absorption layer at the top portion of the first microstructures may be the same as a thickness of the reflective layer or the absorption layer at the bottom portion of the first microstructures. In an embodiment of the disclosure, physical vapor deposition generally refers to thermal evaporation, electron beam evaporation, magnetron sputtering, ion plating, etc., and a solid material is deposited on the surface of the microstructure formation layer by heating gasification, collision or ionization, etc. The reflective layer may be made of a metal reflective material, a metal reflective layer requires a metal material with high reflectivity, and the metal reflective layer may be made of a full spectrum reflective material and a corresponding alloy, such as aluminum, silver, tin, nickel, chromium and platinum, or a reflective material with a specific color and a corresponding alloy material, such as copper, gold, etc., which provides relatively high reflectivity and meanwhile generate a fixed color. A function of the metal reflective layer is mainly to improve diffraction or reflection efficiency, and the reflective layer does not have a color change effect. A thickness of the reflective layer may be greater than 10 nm, the absorption layer may be made of a metal material with a relatively small thickness, when light passes through the layer, about half of the light is reflected and the other half thereof is transmitted, therefore, the absorption layer may also be called 'transmissive film'. The absorption layer may be made of but is not limited to the materials of chromium, nickel, copper, cobalt, titanium, vanadium, tungsten, tin, silicon, germanium and a combination thereof, and a thickness of the absorption layer may be 2 nm-30 nm.

The dielectric layer is obtained by coating or printing different from forming modes of the absorption layer and the reflective layer. Printing or coating herein is the process of applying a liquid varnish to a film and then performing drying and curing. A forming region may be the whole region of the film (which is called coating process), or may be a partial region of the film (which is called printing process). Specific implementation technologies may have spray coating, roller printing, flexographic printing, gravure printing, screen printing, etc. In an embodiment, a main resin of the dielectric layer obtained by coating or printing is polyurethane, acrylic, polyester or a combination thereof. The dielectric layer, the absorption layer and the reflective layer together form the optically variable coating having a color change effect. A refractive index of most resins is about 1.5, and a printing thickness of the dielectric layer should range from 200 nm to 800 nm in order to obtain a good optically variable effect. A specific thickness of the dielectric layer may be determined according to a required color and a hollow condition together.

The thickness of the dielectric layer at the top portion of the first microstructure and the thickness of the dielectric layer at the bottom portion of the first microstructure may be controlled by controlling a property of a dielectric layer material. The thickness of the dielectric layer in the optically variable coating at the top portion of the first microstructure may be the same as the thickness of the dielectric layer in the optically variable coating at the bottom portion of the first microstructure. Since the dielectric layer is obtained by printing or coating, in addition to the main resin materials, there is generally a solvent, etc., which has fluidity. Therefore, by appropriately adjusting a ratio of the main resin to the solvent, materials with different flowability or viscosity may be obtained. During printing or coating, the bottom portion of the first microstructure is lower than the top portion of the first microstructure, and a material of the dielectric layer is more prone to accumulate at the bottom portion of the first microstructure, such that the thickness of the dielectric layer at the bottom portion of the first microstructure is higher than the thickness of the dielectric layer at the top portion of the first microstructure. When the viscosity of the material of the dielectric layer is relatively high or an opening of the first microstructure is relatively small, the material of the dielectric layer may not be easily used to fill the bottom portion of the microstructure, such that the thickness of the dielectric layer at the bottom portion of the first microstructure is less than the thickness of the dielectric layer at the top portion of the first microstructure. Therefore, the thickness of the dielectric layer at the top portion of the first microstructure may be different from the thickness of the dielectric layer at the bottom portion of the first microstructure by adjusting a width of the top portion of the first microstructure and a width of the bottom portion of the first microstructure (for example, adjusting a width ratio of the top portion to the bottom portion when the microstructure layer is manufactured), such that different colors are formed in the first region of the optical anti-counterfeiting element. Therefore, a width of the top portion formed of the convex portion of the first microstructure may be the same as or different from a width of the bottom portion formed of the concave portion of the first microstructure. In addition, a thickness of the dielectric layer at the top portion formed of the convex portion of the first microstructure may be the same as or different from a thickness of the dielectric layer at the bottom portion formed of the concave portion of the first microstructure.

When the thickness of the dielectric layer in the optically variable coating at the top portion of the first microstructure is different from the thickness of the dielectric layer in the optically variable coating at the bottom portion of the first microstructure, a color of the optically variable coating at the top portion of the first microstructure is different from a color of the optically variable coating at the bottom portion of the first microstructure, and the two colors are combined to form a mixed color.

In an embodiment, the first microstructures may have different depths, such that the dielectric layer of the optically variable coating at the bottom portions of the microstructures at different portions have different thicknesses, thereby forming different colors.

In the optical anti-counterfeiting element provided in an embodiment of the disclosure, the microstructure formation layer may further include a second region, the second region is a flat region without microstructures, and the optically variable coating may also homomorphically cover on the surface of the second region. Each layer in the optically variable coating may be formed in one step in the first region and the second region. The same color or two different colors may be obtained in different regions by obtaining the dielectric layer by coating or printing in one step. That is, the first region and the second region may have the same color, or the first region may have a mixed color of two colors and the second region has another color. In an embodiment of the disclosure, positions of the first region and the second region are determined when the microstructure layer is manufactured, and positioning accuracy may reach a nanometer level, may be considered as strict positioning, and is different from conventional overprinting positioning accuracy. The thickness of the dielectric layer in the first region may be exactly the same as, or partially the same as or completely different from the thickness of the dielectric layer in the second region.

In the optical anti-counterfeiting element, the first region may achieve an optically variable relief effect, a dynamic optically variable effect or a simple optically variable effect and a combination thereof, and a color in the above effect may be the same as or different from the color of the second region. For example, the first region has a mixed color of a first color and a second color, and the second region has a third color; or the first region has the relief feature and a mixed color of the first color and the second color, and the second region has the third color; or the first region has the dynamic feature and a mixed color of the first color and the second color, and the second region has the third color; or the first region and the second region have the same color, and the third color may be the same as or different from the first color or the second color.

In the optical anti-counterfeiting element provided in an embodiment of the disclosure, the microstructure formation layer may further include a hollow region, and hollow graphic and text information with a specific meaning may be formed during light transmission observation. In addition, the hollow region may have or not have a strict positioning relation with the first region and the second region. When the hollow region has the strict positioning relation with the first region and the second region, the hollow region is obtained by a second microstructure with a relatively great depth-to-width ratio or a relatively great specific volume, for example, the depth-to-width ratio of the second microstructure is at least greater than the depth-to-width ratio of the first microstructure, or the specific volume of the second microstructure is at least greater than the specific volume of the first microstructure. The 'specific volume' is a ratio of a volume occupied by the microstructure to a projection of the microstructure on the plane of the substrate, and may be approximately regarded as a characteristic height of the microstructure. The surface of the hollow region is not covered with at least the reflective layer in the optically variable coating or three layers in the optically variable coating. During manufacturing, hollowing may be accurately carried out, or at least the reflective layer in the optically variable coating is removed, so as to achieve a light transmission observation hollow effect. The hollow region may not have or have a strict positioning relation with a design pattern.

During the process of forming the optical anti-counterfeiting element, the optically variable coating also covers on the hollow region, and at least the reflective layer on the hollow region should be removed in order to achieve the light transmission observation hollow effect. Since a microstructure of the hollow region has a relatively great depth-to-width ratio or a relatively great specific volume, a coating deposited on the microstructure is relatively thin, and the coating (such as a reflective layer aluminum) on the hollow region is more prone to be corroded by a corrosion solution when passing through the corrosion solution (such as hot lye), such that different corrosion speeds are formed, and only the hollow region has no coatings or at least no reflective layers, and the coatings in other regions are retained. The hollow region may also be obtained by coating with a protective lacquer, since the hollow region has a relatively great depth-to-width ratio or a relatively great specific volume, when the microstructure may not be completely covered by the protective lacquer, and the optically variable coating is hollowed out, the optically variable coating in the hollow region may be accurately hollowed out, and the optically variable coating in the other regions may be retained.

In the optical anti-counterfeiting element provided in an embodiment of the disclosure, the microstructure formation layer may further include a third region, the third region may include at least a bevel cut type microstructure, and a bevel of the bevel cut type microstructure may be gradually varied. A bevel angle of the bevel cut type microstructure may range from 5° to 45°, the bevel cut type microstructure may be a glaring microstructure, a sine type microstructure, etc., a section of the bevel cut type microstructure is in a gradually varied shape. The optically variable coating may also homomorphically cover on the surface of the bevel cut type microstructure. Since physical vapor deposition is used, the reflective layer may keep homomorphic covering, that is, a thickness of the reflective layer on the whole surface from a top portion to a bottom portion of the bevel cut type microstructure is the same. Since the absorption layer is also obtained by physical vapor deposition, a thickness of the absorption layer at each portion of the bevel cut type microstructure is the same. However, since the material of the dielectric layer has certain fluidity and is obtained by coating or printing, the material of the dielectric layer more or less levels out during printing or coating and curing, which renders the dielectric layer growing thicker from the top portion to the bottom portion of the bevel cut type microstructure, such that different positions of the bevel cut type microstructure have different colors, and a mixture of the colors appears white or silver during macroscopic observation. Therefore, a silver feature may be formed by combining the bevel cut type microstructure with a gradually varied section and the optically variable coating with the dielectric layer formed by coating or printing. Further, by properly adjusting a parameter and an arrangement of the bevel cut type microstructure, a silver relief feature or a silver dynamic feature may be obtained.

One or more of the first region, the second region, the hollow region and the third region provided in the embodiment of the disclosure may be randomly combined, and strict positioning is obtained, such that combinations having various effects are achieved, an anti-counterfeiting effect is enhanced, identification by the public is easier, and an anti-counterfeiting capability is improved.

The optical anti-counterfeiting element provided in an embodiment of the disclosure will be further described with reference to different embodiments.

Figure 1:
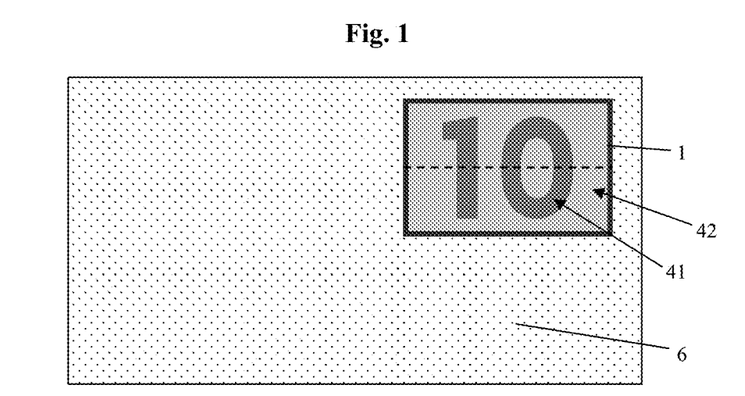
FIG. 1 shows a schematic diagram of application of an optical anti-counterfeiting element according to an embodiment of the disclosure.

FIG. 1 shows a schematic diagram of application of the optical anti-counterfeiting element of the embodiment of the disclosure. In the exemplary application, the optical anti-counterfeiting element 1 is attached to a carrier 6 as a label, the carrier 6 may be, for example, a paper, a security, etc.

Figure 2:
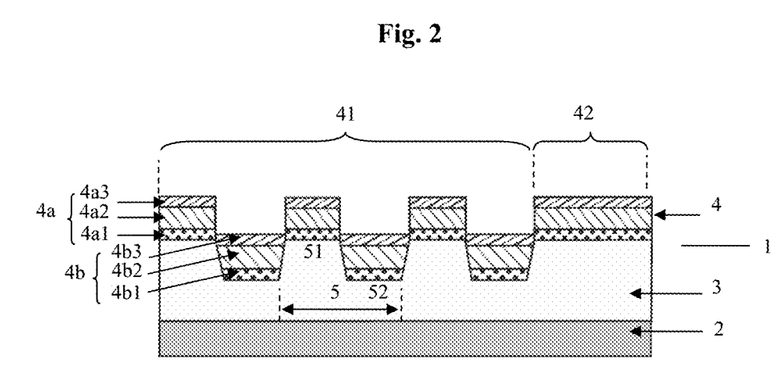
FIG. 2 shows a schematic sectional view at a dashed line of the optical anti-counterfeiting element shown in FIG. 1 according to an embodiment of the disclosure.
Figure 3:
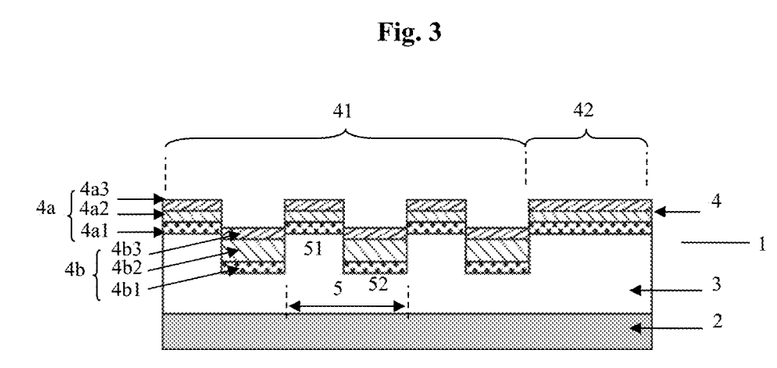
FIG. 3 shows a schematic sectional view at a dashed line of the optical anti-counterfeiting element shown in FIG. 1 according to an embodiment of the disclosure.

FIG. 2 shows a schematic sectional view at a dashed line of the optical anti-counterfeiting element shown in FIG. 1. As shown in FIGS. 1-2, the optical anti-counterfeiting element 1 includes a substrate 2, the substrate 2 has a first surface and a second surface opposite to each other, which may be made of polyethylene terephthalate (PET), etc. A microstructure formation layer 3, which may be made of an ultraviolet curable resin or a thermoplastic material, etc, is formed on the first surface of the substrate 2. The microstructure formation layer has two regions, that is, a first region 41 and a second region 42, wherein the first region 41 is a microstructure region and the second region 42 is a flat region, and there is a microstructure 5 in the first region 41. In FIG. 2, corresponding to the entire microstructure formation layer, the microstructure 5 has a concave portion, such that the microstructure has a top portion 51 and a bottom portion 52. Optically variable coatings homomorphically cover on the first region 41 and the second region 42. An optically variable coating 4a at the top portion 51 of the microstructure includes a reflective layer 4a1, a dielectric layer 4a2 and an absorption layer 4a3. An optically variable coating 4b at the bottom portion 52 of the microstructure includes a reflective layer 4b1, a dielectric layer 4b2 and an absorption layer 4b3. The microstructure 5 in the first region 41 has a period of 10 μm, wherein the top portion 51 of the microstructure has a width of 4 μm, the bottom portion 52 of the microstructure has a width of 6 μm, and the microstructure has a depth of 0.7 μm. The optical anti-counterfeiting element shown in FIG. 3 differs from the optical anti-counterfeiting element shown in FIG. 2 only in that a boundary of the microstructure shown in FIG. 2 has a certain inclination angle, and a boundary of the microstructure shown in FIG. 3 is steep, and is one preferred solution of the microstructure of the embodiment of the disclosure.

The reflective layer 4b1 at the bottom portion 52 of the microstructure, the reflective layer 4a1 at the top portion 51 of the microstructure and the reflective layer on the second region 42 are obtained by thermal evaporation of metal aluminum, and due to a feature of thermal evaporation, deposition thicknesses in different regions are substantially the same, approximately 30 nm.

The dielectric layer is obtained by coating or printing of a resin material, such as an acrylate material, and a refractive index n is about 1.5. In order to obtain relatively good even read uniformity, the material needs to have relatively low viscosity, for example less than 20 cps, such that the material may better level out on the reflective layer. Finally, the absorption layer with a thickness of about 8 nm is obtained by thermal evaporation. During printing or coating, since the first region 41 has a microstructure and the material of the dielectric layer obtained by coating has fluidity, a thickness of the dielectric layer 4a2 remained on the reflective layer 4a1 at the top portion 51 of the microstructure is less than a thickness of the dielectric layer 4b2 remained on the reflective layer 4b1 at the bottom portion 52 of the microstructure, the reason of which may be that the dielectric layer tends to flow to a region with lower potential energy under the action of gravity, such that the thickness of the dielectric layer 4a2 is less than the thickness of the dielectric layer 4b2. Therefore, two kinds of optically variable coatings, that is, the optically variable coating 4a at the top portion of the microstructure and the optically variable coating 4b at the bottom portion of the microstructure in the first region 41, are formed on the first region 41, and the optically variable coatings appear different colors due to different thicknesses of the dielectric layers. The optically variable coating 4b on the second region 42 is the same as the optically variable coating 4a at the top portion of the microstructure in the first region 41.

For example, in an embodiment, the dielectric layer 4a2 has a thickness of 340 nm and appears a first color green, and the dielectric layer 4b2 has a thickness of 400 nm and appears a second color orange. Number '10' in the embodiment of FIG. 1 is composed of the first region 41 and the optically variable coating thereon, and a background is composed of the second region 42 and the optically variable coating thereon. Since the microstructure 5 has a relatively short period, a third color yellow, which is a mixture of the first color green of the optically variable coating 4a at the top portion 51 of the microstructure and the second color orange of the optically variable coating 4b at the bottom portion 52 of the microstructure, is observed during observation. Therefore, when the optical anti-counterfeiting element of the embodiment is observed, yellow number '10' appears on the orange background. When the optical anti-counterfeiting element is tilted, the orange of the background changes into yellow and the yellow of the number '10' changes into green. When the number '10' is observed by using a magnifying lens, obvious orange and green stripes may be observed, which may be used for two-line anti-counterfeiting, such that anti-counterfeiting performance of the optical anti-counterfeiting element is enhanced.

Figure 4:
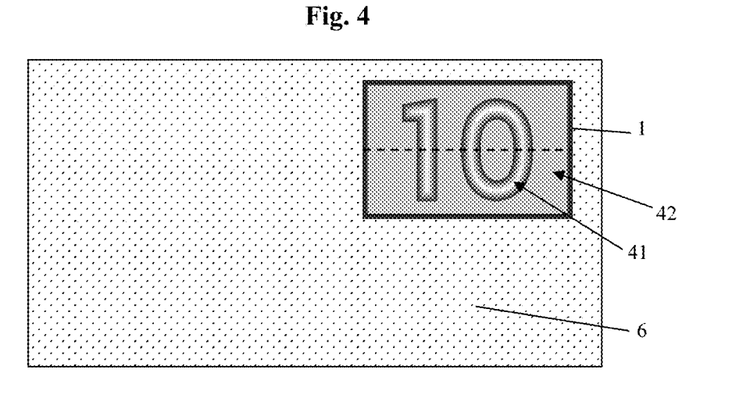
FIG. 4 shows a schematic diagram of application of an optical anti-counterfeiting element according to an embodiment of the disclosure.

FIG. 4 shows a schematic diagram of application of the optical anti-counterfeiting element according to an embodiment of the disclosure. In the exemplary application, the optical anti-counterfeiting element 1 is attached to the carrier 6 as the label, the carrier 6 may be a paper, a security, etc., wherein the number '10' appears an relief feature having a certain color.

Figure 5:
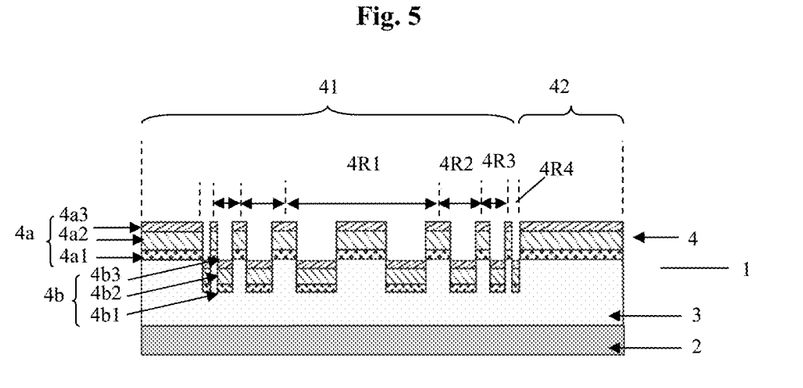
FIG. 5 shows a schematic cross-sectional view at a dashed line of the optical anti-counterfeiting element shown in FIG. 4 according to an embodiment of the disclosure.

FIG. 5 shows a schematic sectional view at a dashed line of the optical anti-counterfeiting element according to one embodiment of the disclosure and shown in FIG. 4. A structure and use of each layer are substantially the same as those described in FIG. 2 or 3, and the differences are as describe below. In the embodiment, in order to achieve the relief feature, a stereoscopic feature is simulated by using a 'binary Fresnel' structure. The principle of the 'binary Fresnel' structure will not be explained in detail, and reference may be made to relevant books and materials of physical optics. Density of the microstructure in the first region 41 represents a fluctuating degree of an relief. For example, the microstructures in a middle portion of the first region 41 are sparse, indicating that the relief is flat, and the microstructures on two sides of the first region 41 are dense, indicating that the relief is steep. In the embodiment, frequency of a portion 4R1 in the first region 41 is relatively low, and provides the observer with a feeling of flatness during actual observation. From a portion 4R2 to a portion 4R3 then to a portion 4R4, frequency sequentially increases and the observer feels steeper and steeper. On the whole, the first region 41 appears a macroscopic feeling of a similar hemisphere with a flat middle portion and two steep ends. Similar to the embodiments shown in FIG. 2 or FIG. 3, the reflective layer and the absorption layer in a homomorphic covering mode are also formed by physical vapor deposition, and the dielectric layer is obtained by printing or coating. Similarly, due to different deposition modes, the reflective layer and the absorption layer obtained by physical vapor deposition basically maintain morphology of original microstructures, and the thickness of the top portion of the microstructure is basically the same as the thickness of the bottom portion of the microstructure. The dielectric layer obtained by coating or printing has certain fluidity or viscosity because the dielectric layer has a solvent before being cured, such that a thickness relation between the dielectric layer at the top portion and the bottom portion of the microstructure may be controlled by controlling a property of a coating/printing material, and the thickness of the top portion may be less than, or the same as or equal to the thickness of the bottom portion. Therefore, when the observer observes the optical anti-counterfeiting element, a stereoscopic relief effect that the first region 41 as a whole protrudes above or sunken below a substrate surface is appeared, and the relief has the first color, which may be the same as or different from the second color of the second region 42 which is flat. When the relief of the first region 41 is observed with a microscope, it can be observed that the first color of the first region 41 is a mixture of a color c1 of the optically variable coating 4a at the top portion of the microstructure and a color c2 of the optically variable coating 4b at the bottom portion of the microstructure.

In an embodiment, the substrate 2 may be made of polyethylene terephthalate (PET), which is transparent. A portion with the highest frequency in the first region 41 has a width of about 2 μm, a portion with the lowest frequency has a width of about 10 μm, and portions with different frequency have depths each of about 0.6 μm. The absorption layers 4a1, 4b1 are made of metal nickel deposited by magnetron sputtering, and have a thickness of about 8 nm. The dielectric layers 4a2 and 4b2 are made of polyacrylate materials, and have a thickness of 450 nm. The reflective layers 4a3 and 4b3 are obtained by thermal evaporation and are made of aluminum chromium alloy (Al/Cr), which has an atomic ratio of metal aluminum to metal chromium being 9:1, and have a thickness about 40 nm. When observed by an observer, the embodiment as a whole appears magenta, that is, by coating/printing of the dielectric layers, a combination of relief optically variable and simple optically variable effects of the same color is obtained.

Figure 6A:
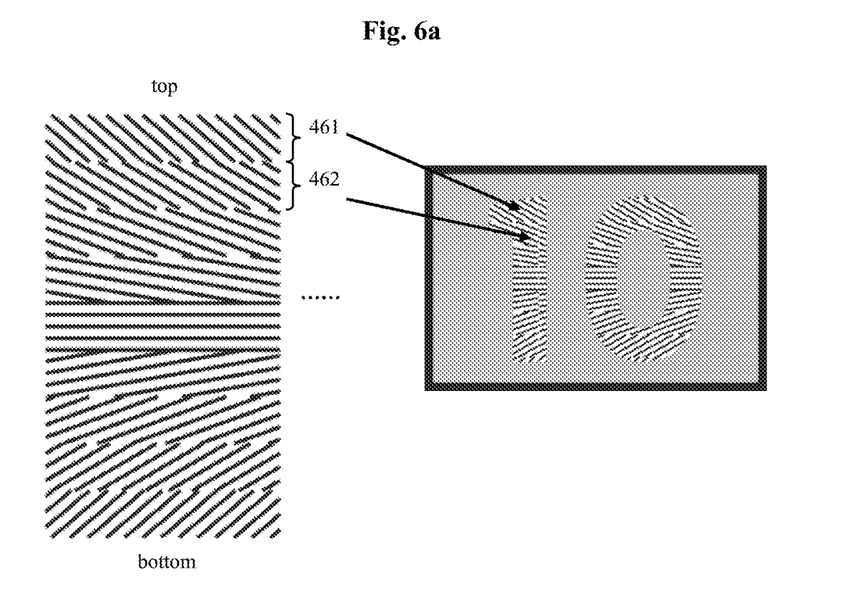
FIG. 6a shows a schematic diagram of an optical anti-counterfeiting element according to an embodiment of the disclosure.
Figure 6B:
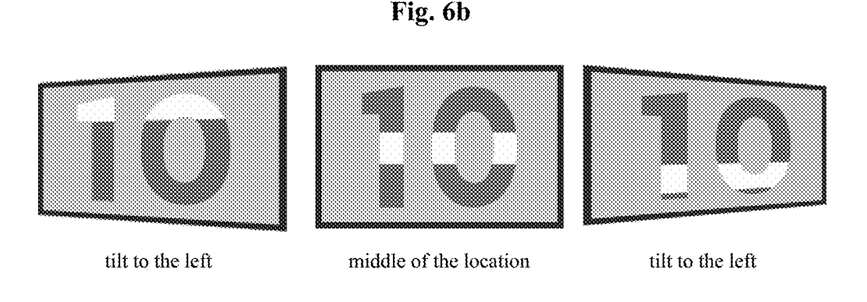

FIG. 6a shows another embodiment according to the disclosure. In the embodiment, from an 'upper' end to a 'lower' end of the optical anti-counterfeiting element, there are a plurality of sub-regions, such as a sub-region 461, a sub-region 462 . . . . The surface of the optical anti-counterfeiting element is covered with the reflective layer/ the dielectric layer/the absorption layer described above, wherein the reflective layer and the absorption layer are obtained by physical vapor deposition, and the dielectric layer is obtained by printing/coating. There are the microstructures in the same direction in the same sub-region, and the microstructures in the different sub-regions may have different directions. For example, the microstructures in a region 461 in FIG. 6a have the same direction, for example, 45 degrees. While the microstructures in the region 462 have the same direction, for example, 35°. That is, rotating is carried out by a small angle, for example, 5°, in a counterclockwise direction on the basis of the direction of the microstructures in the region 461. In other positions, the direction of the microstructure sequentially rotates counterclockwise along with a change of a position of the region until the last region is achieved, for example, −45°. For the optical anti-counterfeiting element, when the optical anti-counterfeiting element is tilted leftwards and rightwards, the microstructures in the different regions may reflect incident light so as to be observed by the observer, and when the regions in different positions are sequentially observed, the dynamic feature is formed. For example, in the optical anti-counterfeiting element 1, there is the number '10', and a region from top to bottom of the number '10' is sequentially filled with microstructures rotating counterclockwise. When the optical anti-counterfeiting element is tilted leftwards, the microstructures of the region 461 and an adjacent region with a similar angle reflect incident light so as to be observed by the observer, such that the region 461 and the adjacent region appear a bright color, which is determined by 'the reflective layer/the dielectric layer/the absorption layer' described above to be capable of being the same as or different from a color of the background other than the number. Therefore, when the optical anti-counterfeiting element is tilted leftwards, the upper portion of the number '10' becomes bright. When the optical anti-counterfeiting element is oriented parallel to the observer, the microstructure at a middle position and parallel to a horizontal direction is observed, such that a middle position of the number '10' becomes bright. When the optical anti-counterfeiting element is tilted rightwards, the microstructure at the bottom portion is oriented parallel to a line connecting human eyes of the observer, and the bottom portion of the number '10' becomes bright. Therefore, when the optical anti-counterfeiting element is tilted from leftwards to rightwards, the number '10' sequentially becomes brighter from the top portion to the middle portion then to the bottom portion, therefore an effect that a bright stripe moves from top to bottom, that is, a dynamic effect is formed.

In the achievement of the dynamic effect, if directions of the microstructures in the same direction are randomly changed to a certain degree, an appearance effect of diffuse reflection may be formed.

In the above optical anti-counterfeiting element, because the microstructures have the flat surface, each region still retains a color even if an optically variable color at the top portion of the microstructure is different from an optically variable color at the bottom portion of the microstructure due to a difference in the thickness of the dielectric layer at the top portion of the microstructure and the thickness of the dielectric layer at the bottom portion of the microstructure, or an optically variable color of the microstructure region is different from an optically variable color of the flat region. However, if there is a bevel, the reflective layer and the absorption layer obtained by physical vapor deposition may maintain the shape of the original microstructure. However, for the dielectric layer obtained by printing/coating, more dielectric materials will accumulate at a lower portion of the bevel due to the existence of certain fluidity. Because the dielectric layer has different thicknesses at different positions of the bevel, the optically variable coating also has different colors at different positions of the bevel, and the different colors of the optically variable coating are mixed to form white, that is, achromatism is achieved.

Figure 7:
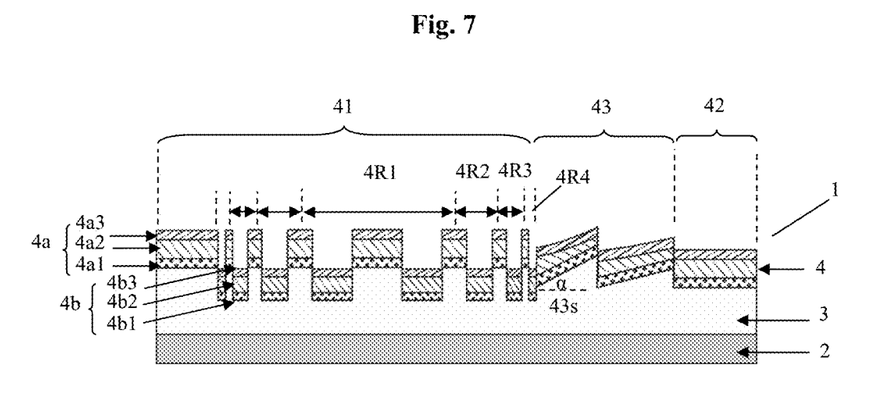
FIG. 7 shows a schematic sectional view of an optical anti-counterfeiting element according to an embodiment of the disclosure.

FIG. 7 shows a schematic sectional view of an optical anti-counterfeiting element according to an embodiment of the disclosure. Here, only the differences from the above embodiments will be described. For example, in FIG. 7, the first region 41 is of the binary Fresnel structure, and the relief effect is formed by the density of the microstructures. The second region 42 is the flat region having the flat surface. There is the bevel cut type microstructure in a third region 43, and the bevel angle α of the bevel cut type microstructure varies from 45° to 5°. There is a reflective layer aluminum obtained by thermal evaporation and having a thickness of about 50 nm, polyacrylates obtained by coating and having a thickness of about 460 nm on a flat surface, and an absorption layer nickel obtained by magnetron sputtering and having a thickness of about 8 nm on the above regions respectively. The first region 41 appears a color relief effect, and the color of the relief is determined by the property of the dielectric layer obtained by coating, and may be the same as or different from the color of the second region 42 which is flat. In the third region 43, the dielectric layer may not homomorphically cover on the bevel of the microstructure 43s, that is, the dielectric layer is relatively thick at the lower portion of the microstructure 43s, and the dielectric layer is relatively thin at the upper portion of the microstructure 43s. Non-homomorphic covering results in different colors of the optically variable coating covering different positions on the bevel 43s of the microstructure (a feature period is about 20 μm), and the different colors of the optically variable coating with different thicknesses are mixed together to form an extinction effect, and finally white or silver is macroscopically appeared. The microstructures of the regions 43 may form dynamic, relief or random distribution effects through proper arrangement.

Figure 8A:
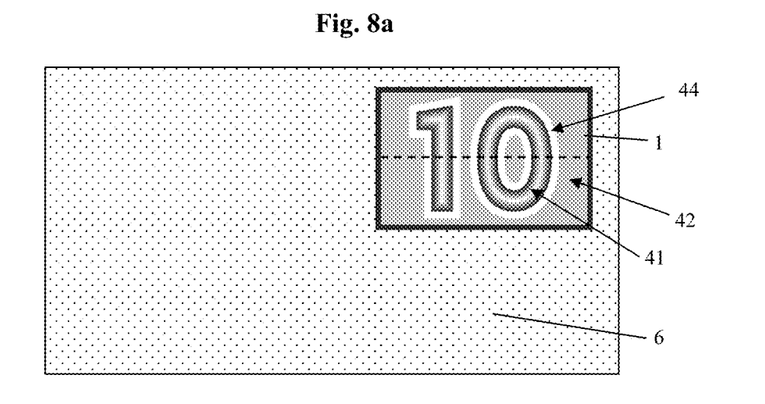
FIG. 8a shows a schematic diagram of application of an optical anti-counterfeiting element of an embodiment of the disclosure.
Figure 8B:
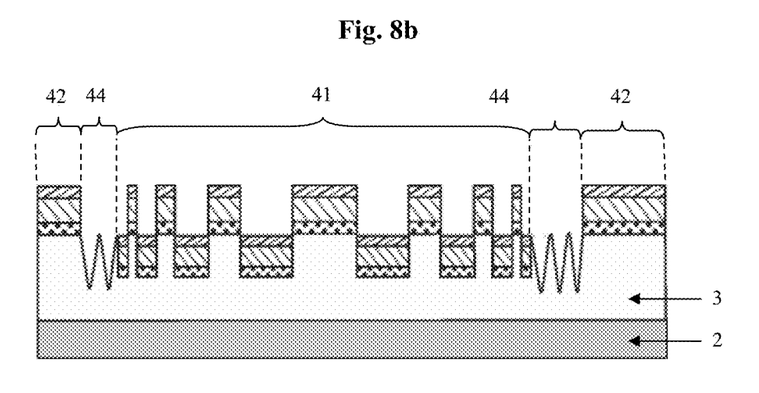
FIG. 8b shows a schematic sectional view at a dashed line of the optical anti-counterfeiting element shown in FIG. 8a according to an embodiment of the disclosure.

In an embodiment, the optical anti-counterfeiting element provided in the embodiment of the disclosure may further include a hollow region to form graphic and text information with a specific meaning. The hollow region may not be covered with at least the reflective layer of the optically variable coating, that is, may be covered with the dielectric layer and the absorption layer of the optically variable coating, or may not be covered with three layers of the optically variable coating. In addition, a hollow graphic and text region may not have or have a strict positioning relation with a design pattern. FIG. 8a shows a schematic diagram of a hollow sample with a strict positioning relation. The optical anti-counterfeiting element 1 includes a flat second region 42 forming a second color, a first region 41 including a binary Fresnel microstructure and having a first color, and a hollow region 44 without a coating. FIG. 8b shows a schematic sectional view of the optical anti-counterfeiting element 1 shown in FIG. 8a. Only the differences from the above embodiments will be described herein. The hollow region adopts microstructures with a relatively great depth, the coatings deposited on the structures are relatively thin, and the coatings (such as aluminum) on the hollow region are more prone to be corroded by a corrosion solution when passing through the corrosion solution (such as, hot lye), such that different corrosion speeds are formed, and only the region 44 has no coating and the coatings in the other regions are retained. Since the microstructures of the region 44 are formed on the microstructure formation layer 3 when the microstructures are manufactured, a position relation between the regions (the first region 41, the second region 42, and the region 44) on the microstructure formation layer is determined, which may achieve in a nanometer size, and may be considered as strictly positioned. Therefore, hollow graphic and text may be strictly positioned with pattern information, for example, a hollow outline around the color relief in FIG. 8a is the same as a shape and position of the number '10'. The precision may not be achieved by traditional printing hollowing out.

Correspondingly, an embodiment of the disclosure further provides a manufacturing method of an optical anti-counterfeiting element, and the optical anti-counterfeiting element may be the optical anti-counterfeiting element according to any embodiment of the disclosure. The manufacturing method may include:

S1, providing a substrate, the substrate has a first surface and a second surface opposite to each other. The substrate may be transparent or at least partially transparent, may also be a colored dielectric layer, may also be a transparent dielectric film with a functional coating on a surface, and may also be a compounded multi-layer film.

S2, arranging a microstructure formation layer on the first surface of the substrate. The microstructure formation layer may be replicated in batches by ultraviolet casting, mould pressing, nano-impressing and other processing modes.

S3, forming at least a first region on the microstructure formation layer, the first region includes at least a first microstructure, and the first microstructure includes a convex portion and/or a concave portion. In an embodiment, the convex portion and the concave portion have flat surfaces, or the convex portion or the concave portion has a flat surface, that is, a top portion and a bottom portion of the first microstructure may be alternatively flat surfaces. More specifically, the first microstructure in an embodiment of the disclosure is a microstructure with a flat top portion, a flay bottom portion and a steep side wall. S4, forming an optically variable coating on the microstructure formation layer, including:

S41, form a reflective layer or an absorption layer homomorphically covering on the microstructure formation layer;

S41, obtaining a dielectric layer on the reflective layer or the absorption layer by coating or printing; and S43, forming the absorption layer homomorphically covering on the dielectric layer under the circumstance that the reflective layer is formed on the first microstructure, or forming the reflective layer homomorphically covering on the dielectric layer under the circumstance that the absorption layer is formed on the first microstructure.

The absorption layer and the reflective layer may be obtained by vapor deposition, for example, by physical vapor deposition, so as to keep the same shape as the microstructure formation layer, that is, homomorphic covering is achieved. In an embodiment of the disclosure, physical vapor deposition generally refers to thermal evaporation, electron beam evaporation, magnetron sputtering, ion plating, etc., and a solid material is deposited on the surface of the microstructure formation layer by heating gasification, collision or ionization, etc. The dielectric layer is obtained by coating or printing. Printing or coating herein is the process of applying a liquid varnish to a film and then performing drying and curing.

One or more of the following regions may also be formed on the microstructure formation layer: a second region which is flat; a third region, the third region includes at least a bevel cut type microstructure; and a hollow region, the hollow region includes at least a second microstructure, a depth-to-width ratio of the second microstructure is greater than a depth-to-width ratio of the first microstructure, or a specific volume of the second microstructure is greater than a specific volume of the first microstructure.

Under the circumstance that the hollow region is formed in the microstructure formation layer, after the step of forming an optically variable coating on the microstructure formation layer, the manufacturing method further includes: immersing a structure formed in the above steps into a corresponding corrosion solution (such as, a solution capable of corroding at least the reflective layer), so as to remove the reflective layer at least covering on the hollow region; taking out and cleaning the structure which is corroded; or the manufacturing method further includes: coating the optically variable coating with a protective lacquer; immersing a structure formed in the above steps into a corresponding corrosion solution (such as, a solution capable of corroding at least the reflective layer), so as to remove the reflective layer at least covering on the hollow region; and taking out and cleaning the structure which is corroded, using water or other solution to clean the corrosion solution, and carry out drying.

For the definition of the features of the optical anti-counterfeiting element in the manufacturing method of an optical anti-counterfeiting element provided in the embodiment of the disclosure, please refer to the description of the optical anti-counterfeiting element provided in the embodiment of the disclosure, and will not be repeated here.

The optical anti-counterfeiting element according to the disclosure is particularly suitable for making window security thread. The window security thread may have a thickness not greater than 50 µm. Anti-counterfeiting paper with the window security thread is used for anti-counterfeiting of various high-safety products such as banknotes, passports and securities.

The optical anti-counterfeiting element according to the disclosure may also be used as a label, a logo, a wide strip, a transparent window, a coating film, etc., and may be bonded to various articles through various bonding mechanisms. For example, the optical anti-counterfeiting element may be transferred to high-safety products and high value-added products such as banknotes and credit cards.

The other aspect of the disclosure provides an optical anti-counterfeiting product with an optical anti-counterfeiting element, the product includes but not limited to a banknote, a credit card, a passport and various high-safety and high value-added products, as well as various packing paper, packing boxes, etc.

The specific implementation of the embodiment of the disclosure is described in detail above with reference to the accompanying drawings. However, the embodiments of the disclosure are not limited to specific details of the implementation described above. Within the scope of the technical concept of the embodiments of the disclosure, various simple modifications can be made to the technical solutions of the embodiments of the disclosure, and these simple modifications all fall within the scope of protection of the embodiments of the disclosure.

It should also be noted that various specific technical features described in the specific implementations described above may be combined in any suitable manner, without contradiction. In order to avoid unnecessary repetition, the embodiments of the disclosure will not describe various possible combinations separately.

Those skilled in the art can understand that all or part of the steps of the methods in the above embodiments may be implemented by instructing associated hardware by means of a program, where the program is stored in a storage medium and includes several instructions for enabling a single chip microcomputer, a chip or a processor to implement all or part of the steps of the methods described in the various embodiments of the disclosure. The foregoing storage dielectric includes a USB flash drive, a read-only memory (ROM), a random access memory (RAM), a mobile hard disk drive, a diskette or optical disk, etc., which may store program codes.

In addition, various different implementations of the embodiments of the disclosure may also be combined randomly, so long as they do not deviate from the idea of the embodiments of the disclosure, and they should also be regarded as disclosed in the embodiments of the disclosure.

What is claimed is:

1. An optical anti-counterfeiting element, comprising:
    a substrate, wherein the substrate has a first surface and a second surface opposite to each other;
    a microstructure formation layer formed on the first surface, the microstructure formation layer comprises at least a first region, the first region comprises at least a first microstructure, the first microstructure comprises a convex portion and/or a concave portion; and
    an optically variable coating homomorphically covering on the first microstructure, the optically variable coating comprises a reflective layer, a dielectric layer and an absorption layer which are stacked in sequence, wherein the reflective layer or the absorption layer is in contact with the first microstructure, and the dielectric layer is obtained by coating or printing;
    a top portion of the convex portion and a bottom portion of the concave portion have a flat surface;
    a thickness of the dielectric layer at the top portion of the convex portion is different from a thickness of the dielectric layer at the bottom portion of the concave portion;
    side walls of the convex portion and the concave portion of the first microstructure are steep.

2. The optical anti-counterfeiting element according to claim 1, wherein the microstructure formation layer further comprises one or more of the following:
    a second region which is flat, the optically variable coating further homomorphically covers on the surface of the second region; a third region, the third region comprises at least a bevel cut type microstructure, and the optically variable coating further covers on the surface of the bevel cut type microstructure; and
    a hollow region, wherein the hollow region comprises at least a second microstructure, and a depth-to-width ratio of the second microstructure is greater than a depth-to-width ratio of the first microstructure, or a specific volume of the second microstructure is greater than a specific volume of the first microstructure, the specific volume is a ratio of a volume occupied by the first microstructure or the second microstructure to a projection of the first microstructure or the second microstructure on a plane of the substrate.

3. The optical anti-counterfeiting element according to claim 2, wherein the hollow region has a strict positioning relation or does not have a positioning relation with the first region and the second region.

4. The optical anti-counterfeiting element according to claim 2, wherein a bevel angle of the bevel cut type microstructure ranges from 5°-45°.

5. A manufacturing method of an optical anti-counterfeiting element accordingly to claim 1, comprising:
    providing a substrate, the substrate has a first surface and a second surface opposite to each other;
    arranging a microstructure formation layer on the first surface of the substrate;
    forming at least a first region on the microstructure formation layer, the first region comprises at least a first microstructure, and the first microstructure comprises a convex portion and/or a concave portion; and
    forming an optically variable coating on the microstructure formation layer, comprising:
        forming a reflective layer or an absorption layer homomorphically covering on the microstructure formation layer;
        obtaining a dielectric layer on the reflective layer or the absorption layer by coating or printing; and
        forming the absorption layer homomorphically covering on the dielectric layer under the circumstance that the reflective layer is formed on the first microstructure, or forming the reflective layer homomorphically covering on the dielectric layer under the circumstance that the absorption layer is formed on the first microstructure.

6. The manufacturing method according to claim 5, wherein the manufacturing method further comprises forming one or more of the following on the microstructure formation layer before forming the optically variable coating on the microstructure formation layer:
    a second region which is flat;
    a third region, the third region comprises at least a bevel cut type microstructure; and
    a hollow region, the hollow region comprises at least a second microstructure, and a depth-to-width ratio of the second microstructure is greater than a depth-to-width ratio of the first microstructure, or a specific volume of the second microstructure is greater than a specific volume of the first microstructure, the specific volume is a ratio of a volume occupied by the first microstructure or the second microstructure to a projection of the first microstructure or the second microstructure on a plane of the substrate.

7. The manufacturing method according to claim 6, wherein under the circumstance that the hollow region is formed in the microstructure formation layer, and after the optically variable coating is formed on the microstructure formation layer, the manufacturing method further comprises:
    immersing a structure formed in the above steps into a corresponding corrosion solution, so as to remove the reflective layer at least covering on the hollow region; and
    taking out and cleaning the structure which is corroded; or
    the manufacturing method further comprises:
    coating the optically variable coating with a protective lacquer;
    immersing a structure formed in the above steps into a corresponding corrosion solution, so as to remove the reflective layer at least covering the hollow region; and
    taking out and cleaning the structure which is corroded.

8. The optical anti-counterfeiting element according to claim 1, wherein
    a width of the top portion formed of the convex portion of the first microstructure is the same as or different from a width of the bottom portion formed of the concave portion of the first microstructure; and/or
    there are multiple first microstructures, and the first microstructures have the same or different depths.

9. The optical anti-counterfeiting element according to claim 1, wherein the first microstructure forms a letter, a number, a character and/or a pattern in the first region.

10. The optical anti-counterfeiting element according to claim 1, wherein there are multiple first microstructures,
    the first microstructures have the same period; or
    each of the periods of the first microstructures changes according to a preset rule.

11. The optical anti-counterfeiting element according to claim 10, wherein each of the periods of the first microstructures changes according to a binary Fresnel structure.

12. The optical anti-counterfeiting element according to claim 1, wherein
    there are multiple first microstructures, and directions of the first microstructures are the same; or
    the first microstructures with different directions are arranged in different parts of the first region.

13. The optical anti-counterfeiting element according to claim 1, wherein the reflective layer and the absorption layer are obtained by vapor deposition.

14. The optical anti-counterfeiting element according to claim 1, wherein a viscosity of a material of the dielectric layer is less than 20 cps.

15. The optical anti-counterfeiting element according to claim 1, wherein a thickness of the reflective layer is greater than 10 nm, a thickness of the absorption layer is 2 nm-30 nm, and a thickness of the dielectric layer is 200 nm-800 nm.

16. An optical anti-counterfeiting product, comprising the optical anti-counterfeiting element according to claim 1.

* * * * *